WOOD-TURNING,
Pattern Section,
Copying, Cutter, Rotary,
Fixed Bearings.
EXAMINER'S ROOM.
2 Sheets-Sheet 1.
T. Clark,
Turning Irregular Forms.
No. 182. Reissued Nov. 12, 1850.
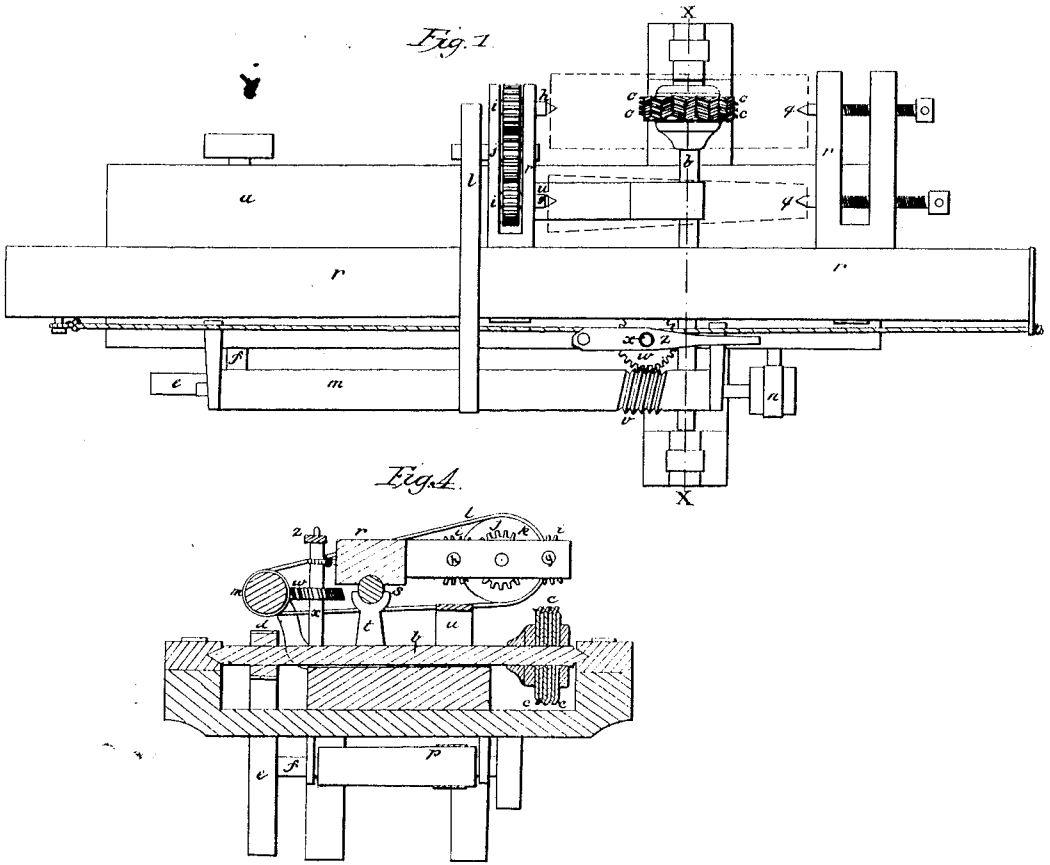
AM. PHOTO-LITHO. CO. N.Y. (OSBORNE'S PROCESS.)

142. WOOD-TURNING,
Pattern Section,
Copying, Cutter, Rotary,
Fixed Bearings.
11-
2 Sheets-Sheet 2.
T. Clark,
Turning Irregular Forms.
No. 182. Reissued Nov. 12, 1850.
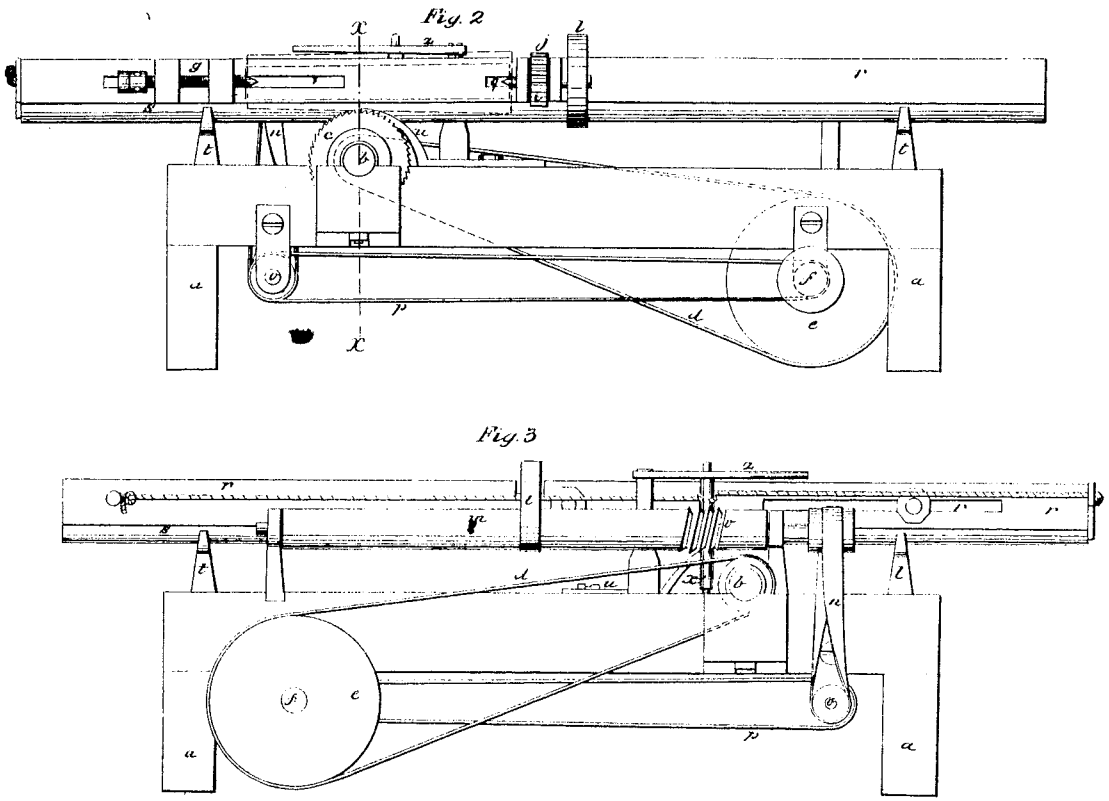
AM. PHOTO-LITHO. CO. N.Y. (OSBORNE'S PROCESS.)

United States Patent Office

PTO - BOYERS, PA Duty Station

MISSING PAGE TEMPORARY NOTICE

PATENT # Re 182 FOR ISSUE DATE 11-12-1850

HAS BEEN SCANNED, BUT WITH MISSING PAGE(S). UPON RECEIVING OF MISSING PAGE(S), THE ENTIRE DOCUMENT WILL BE RESCANNED. PLEASE CALL THE OFFICE OF DATA BASE ADMINISTRATION AT (703) 308-0555 IF YOU HAVE A QUESTION.

THIS NOTICE IS FOR THE MISSING PAGE CONTAINING:

all text

Data Conversion Operation

Boyers, Pa